Feb. 23, 1926.

E. C. POOL 1,574,109

WEIGHING SCALE

Filed March 29, 1918   3 Sheets-Sheet 1

Witnesses
H. H. Lybrand

Inventor
Elmer C. Pool
By George R. Frye
Attorney

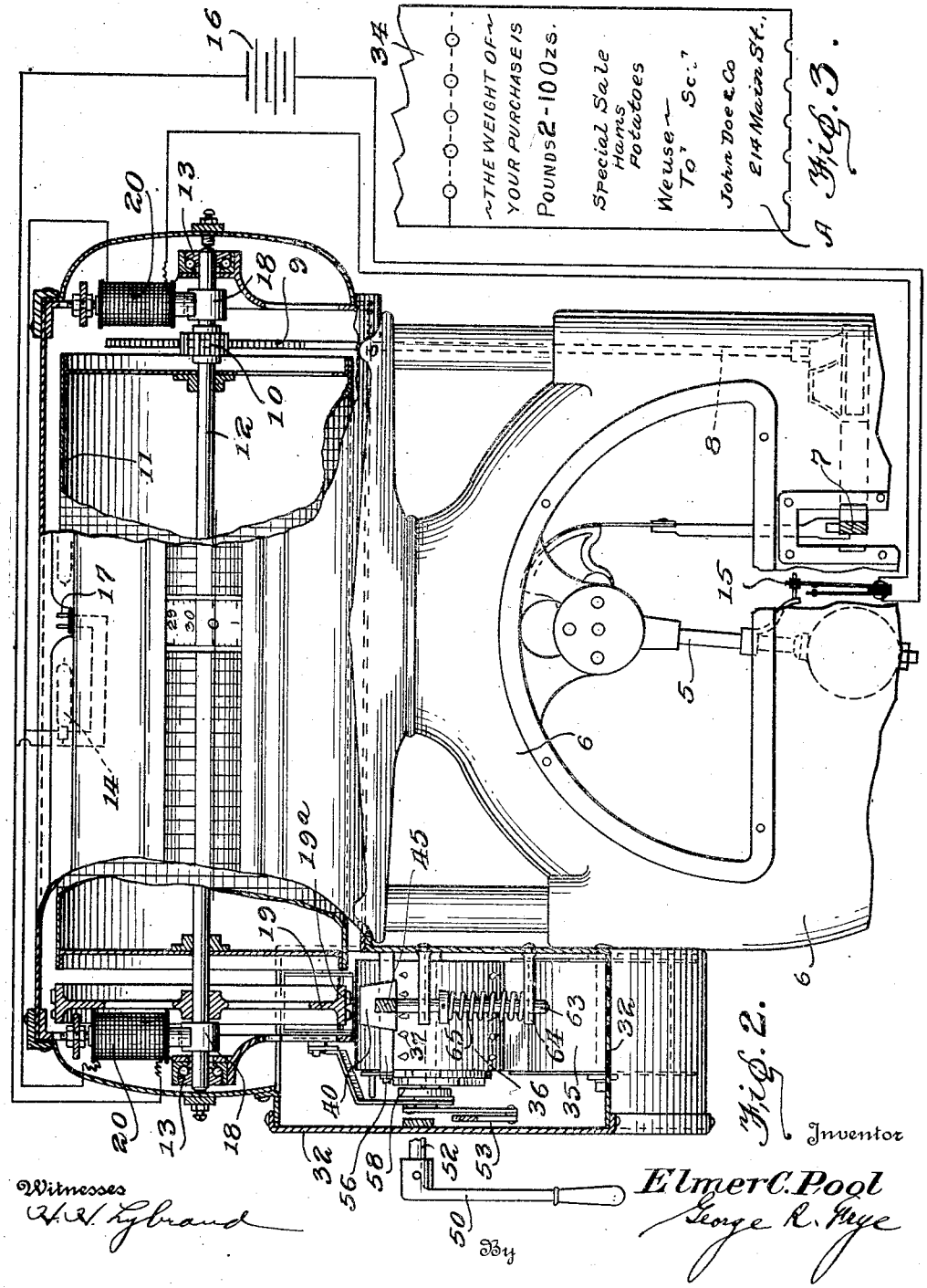

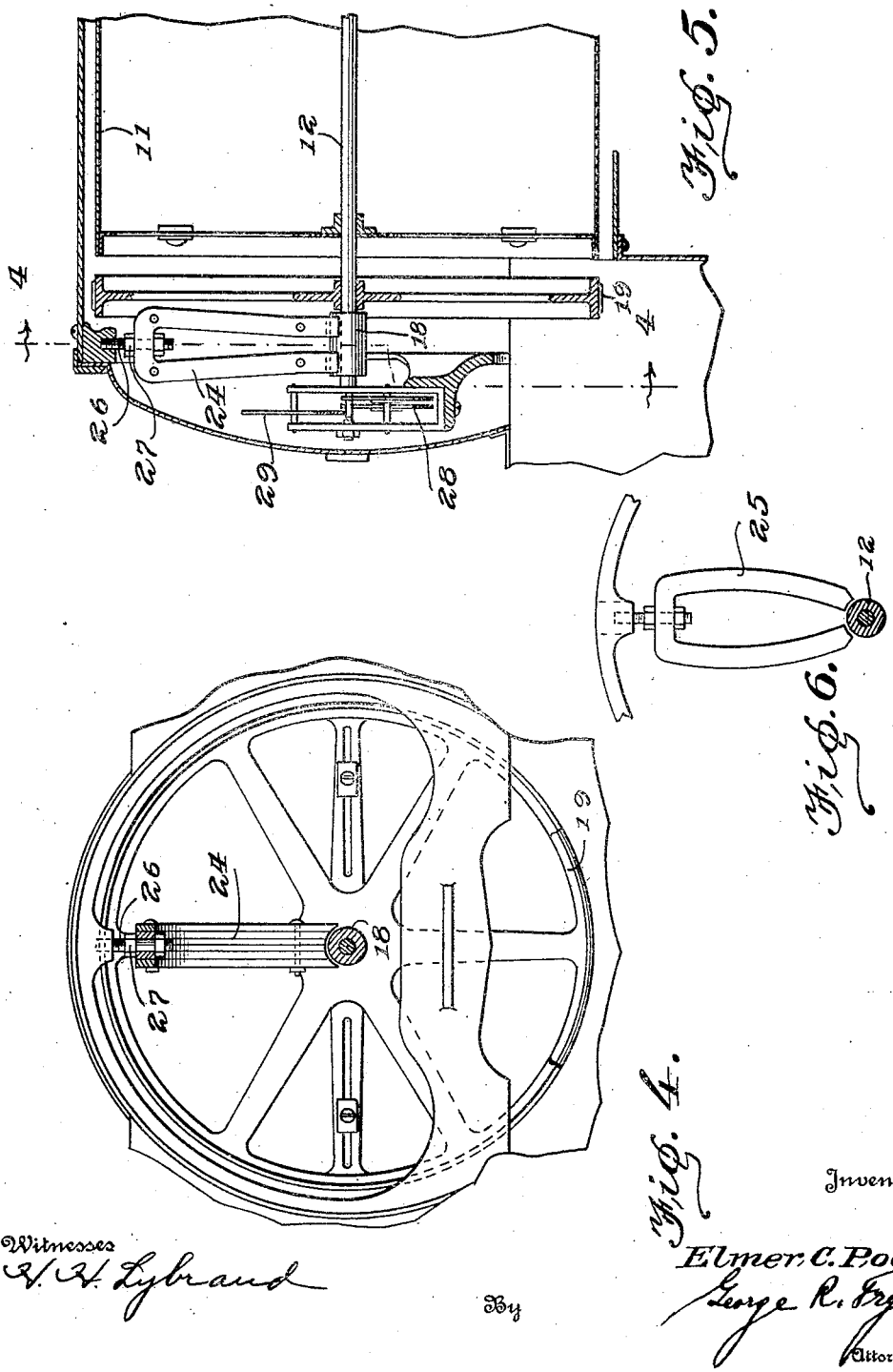

Patented Feb. 23, 1926.

1,574,109

UNITED STATES PATENT OFFICE.

ELMER C. POOL, OF NEW CASTLE, PENNSYLVANIA, ASSIGNOR TO TOLEDO SCALE COMPANY, OF TOLEDO, OHIO, A CORPORATION OF NEW JERSEY.

WEIGHING SCALE.

Application filed March 29, 1918. Serial No. 225,475.

*To all whom it may concern:*

Be it known that I, ELMER C. POOL, a citizen of the United States, residing at New Castle, in the county of Lawrence and State of Pennsylvania, have invented certain new and useful Improvements in Weighing Scales, of which the following is a specification.

This invention relates to weighing scales and more particularly to automatic weighing scales having a pendulum or equivalent means for offsetting the weight of an article and revealing such weight through a rotary indicating element. Rotary indicating scales have heretofore been made with the indicating mechanism in the form of a light cylinder or index hand fixed on a delicately mounted shaft. Such delicacy and lightness while increasing the difficulty of building and maintaining the scale, have been considered essential for accuracy and sensitiveness. One scale builder and patentee—Albert U. Smith—emphasizes the need for lightness in the indicating mechanism and evidences the degree of lightness he deems required when he states he aims to secure a structure so light that the force necessary to operate it is almost insignificant (Smith Re-issue Patent No. 11,536, re-issued April 28, 1896). Because of this extreme lightness it has hitherto been considered impracticable to secure on the shaft of the indicating element any weight that could possibly be carried elsewhere, though it is obvious that in certain kinds of scales, such as printing scales, it is very desirable to have the printing wheel carried by the indicating mechanism.

The primary object of my invention is to construct a scale with a rotative indicating element capable of supporting weights considerably in excess of the usual indicating mechanisms without impairing the sensitiveness or accuracy of the scale.

A further object is to provide a mounting for rotative scale indicating mechanisms wherein a large proportion of the weight of the indicating mechanism is carried magnetically to reduce the weight of such mechanism supported on the bearings.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating preferred embodiments of my invention and wherein similar reference numerals designate similar parts throughout the several views.

In the drawings:

Figure 2 is a front elevation thereof with parts broken away and shown in section;

Figure 3 is a detail view of a ticket such as may be printed therein;

Figures 4 and 5 are detail views of another form of magnetic mounting for the indicating element, Figure 4 being taken substantially on the line 4—4 of Figure 5; and Figure 6 is a detail side elevation of a further form of magnetic mounting.

Figure 1:
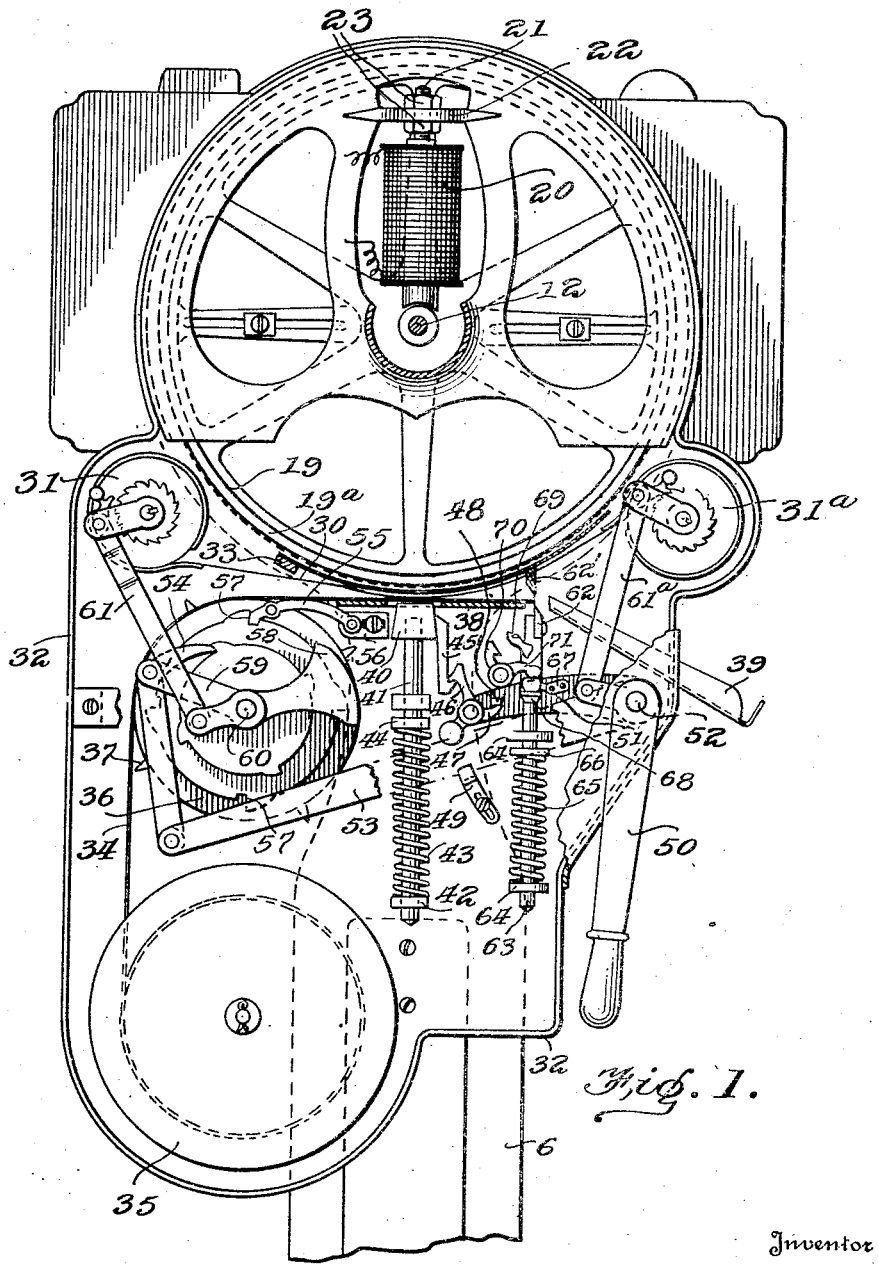
Figure 1 is an end elevation with parts broken away of the upper portion of a printing scale having its rotative element magnetically supported in accordance with my invention.

In the drawings, I have illustrated only so much of the scale mechanism as is necessary to portray the effective operation of the indicating mechanism thereof, it being understood that any efficient weight-offsetting mechanism can be employed in connection with well-known platform leverage supporting means connected and arranged to move the weight-offsetting mechanism and rotate the indicating mechanism accordingly.

The scale herein shown is of a type well known through extensive scales on the market and many prior patents, and is provided with a pendulum 5 mounted within a casing 6 and connected with a scale beam or similar lever 7 which is also connected with a rack rod 8, the rack 9 of which meshes with a pinion 10 on the shaft of the indicating mechanism. Thus, when a load is being weighed the lever 7 is depressed, swinging the pendulum 5 upwardly and outwardly to a position counterbalancing the weight of the load, the downward movement of the lever 7 being simultaneously communicated to the rack rod 8 to rotate the indicating mechanism through a sufficient arc to indicate the weight of the load. The indicating mechanism herein shown comprises a cylinder 11 marked on its periphery with suitable weight graduations and fixed upon a shaft 12 supported at its ends by suitable bearings 13 (see Fig. 2). If desired, the cylinder periphery may bear computations showing the value of the various weights at different prices per unit of weight. Should it be desired to illuminate the indicating mechanism to facilitate the reading thereof, suitable electric lamps, as 14, may be arranged in the scale casing adjacent the reading line, these lamps being preferably in circuit with a suitable switch, as 15, normally maintained open when no load is being weighed upon the scale. As soon as the pendulum 5 moves upwardly to offset the weight of the load the switch 15 is closed and the lamps illuminated, the source of current being derived either from batteries 16 or through suitable connections such as a plug 17 from the local current, which may, of course, be either direct or alternating. The scale mechanism thus far described is substantially in accordance with that disclosed in the patent to Hapgood, No. 1,166,128, patented December 28, 1915.

I have, however, materially increased the weight of my indicating element over that shown in the Hapgood patent by enlarging the shaft 12 adjacent its ends, substantially as shown at 18, and by securing directly on the shaft 12 a type-carrying printing wheel 19. Directly above each of the enlarged portions 18 I provide magnets 20, the poles of which are closely adjacent to, though out of contact with, the shaft, provisions being made for adjusting the height of the magnets to maintain any desired spacing. The adjusting means herein shown comprises the bolt 21 extending through an aperture in the bracket 22 on the scale casing and engaging with lock nuts 23 on opposite sides of the bracket. The magnets are adjusted both as to strength and spacing from the shaft 12 so that practically the entire weight of the rotative element is carried by the magnets. In other words, the magnets when energized attract the shaft and support magnetically a considerable portion of the weight thereof, the bearings 13 merely serving to maintain the correct position of the shaft 12. Thus, the indicating mechanism floats in the bearings 13 and the force necessary to rotate it may be quite inconsiderable even though the weight of the indicating element is comparatively great, the major portion of the weight being magnetically supported through the action of the magnets 20. In the form shown in Figs. 1 and 2 I have illustrated the magnets as electro-magnets, and placed them in the same circuit with the lamps 14, whereby it will be seen that the magnets are energized only during the weighing operation of the scale. As long as the scale is idle no current is consumed and the weight of the indicating element is carried by the bearings 13, but immediately upon the operation of the scale the magnets 20 are energized and float the indicating element. Electro-magnets using the alternating current are preferred, inasmuch as the vibrations thereof serve to aid in decreasing the friction of the shaft in the bearings and rendering the indicating device most sensitive.

In Figs. 4, 5 and 6 I have illustrated constructions wherein permanent magnets 24 and 25 are employed. In Figs. 4 and 5 I utilize a laminated horse-shoe magnet with the poles arranged in parallel relation to the shaft 12, these pole pieces being shaped to conform closely to the enlarged portions 18 of the shaft and being adjustable as to height through the bolt 26 and lock nuts 27. In these figures I have also shown another form of bearing that can readily be utilized with the invention, consisting of a pair of lower discs 28 mounted on parallel shafts and with their peripheries overlapping to form a V in which rests the end portion of the shaft 12, a third or upper roller 29 being suitably mounted above the shaft to just touch the upper portion thereof. The three anti-friction discs 28 and 29 in combination form a seat for the shaft 12, while preventing upward movement thereof due to an excessive magnetic pull. In Fig. 6 I have shown a permanent magnet of the horseshoe type with its poles arranged transversely of the shaft 12.

The weight-printing mechanism will now be described. The weight carrying wheel 19, as hereinbefore stated, is fixed to the shaft 12 and rotates therewith under the pull exerted thereon through the rack 9 and pinion 10. Thus, the type wheel 19 rotates through exactly the same arc as the chart 11 and brings into alignment with any fixed point type showing the weight of the article offset. In the illustrated embodiment I have preferred to place the zero indication on the type wheel at the lower extremity thereof, substantially 90° below the reading line on the chart 11. Immediately below the type 19ª I have arranged a printing ribbon 30 passing between spools 31 and 31ª suitably mounted on shafts in the casing 32 of the printing mechanism. Suitable guides, as 33, can be arranged at the sides of the printing ribbon to prevent lateral play. A perforated strip of tickets 34 upon which the weights are to be printed is wound around a spool 35 and extends therefrom over a feed roller 36 having projecting pins 37 thereon arranged to fit into the perforations on the tickets to secure exact positioning of each card as it passes under the type wheel. The ticket strip thence extends over a plate 38 immediately below the inking ribbons 30, the forward extremity of which plate is adjacent the receiving chute 39. Intermediate its ends the plate 38 is apertured to permit the passage of a printing hammer 40 carried at the upper extremity of a rod 41 guided for vertical movement by brackets 42 on the casing 32, a spring 43 arranged between the lower bracket and the collar 44 on the rod serving to press the rod upwardly. A catch 45 normally engaged by the ratchet 46 serves to prevent the upward travel of the printing hammer to its fullest extent until it is desired to print, the ratchet 46 being preferably weighted to maintain an upright position while being prevented from too great a forward movement by the arm 47 engaging the stop 48. An adjustable bracket 49 is secured in the casing 32 in position to engage the weighted arm of the ratchet 46 when it is desired to release the printing hammer to effect an impression on a ticket. This printing impression is secured whenever desired by grasping the hand lever 50 and swinging it outwardly. The arm 51 secured on the same shaft 52 as the hand lever carries the weighted ratchet 46, and the outward movement of the hand lever serves to swing the ratchet 46 downwardly, thereby pulling upon the catch 45 to lower the printing hammer against the tension of the spring 43. This downward movement is maintained until the weighted arm of the ratchet engages the stop 49, whereupon the catch 45 is released, the spring returning the printing hammer with sufficient pressure to effect an impression by forcing the ticket and the ink ribbon against the type on the printing wheel 19. This imprint is preferably marked upon the tickets A in alignment with the wording "Pounds—Ozs.", as shown in Figure 3, the tickets being held in position so that each impression will be on the desired line through the projecting pins on the roller 36 and the perforations in the ticket strip.

Simultaneously with the downward movement of the arm 51 is effected a similar downward movement of the arm 53 fixed on the same shaft 52, whereby means are provided to advance the ticket strip after the printing has been effected. Thus, a pawl 54 is carried at the rear extremity of the lever 53 and engages with a series of projecting teeth on the drum 36. As the hand lever 50 is swung outwardly the pawl 54 is advanced one notch and on the return of the handle after the printing impression has been obtained the drum 36 and the ticket strip 34 are advanced through a sufficient arc to eject the printed ticket and move into position the next adjacent ticket on the strip. To prevent the accidental movement of the drum 36 I preferably provide means for locking the same in exact position required for effecting the printing in the proper positions on the strips. Thus, in the illustrated embodiment I have provided a locking pawl 55 pivoted at one end on an adjustable bracket 56 on the casing 32, the other end falling into one of a series of notches 57 on the drum 36. Before the drum can be rotated under the power exerted on the pawl 54 it is necessary to lift the locking pawl 55 from its seat in a notch 57, and I accomplish this when desired by means of the eccentric plate 58 carried at one extremity of an arm 59 pivoted on the same shaft 60 as the drum 36, the opposite end of the shaft being pivotally connected with the pawl 54. With this construction whenever the pawl 54 is advanced to the next tooth preliminary to rotating the drum 36 the arm 59 is swung to bring the eccentric plate 58 under the locking pawl 55, thereby lifting the locking pawl from its notch 57 and freeing the drum 36. When the hand lever 50 is returned to its original position the eccentric plate 58 is returned from below the locking pawl, which falls into the next notch 57. To advance the ink ribbon after each printing impression I provide links 61 and 61$^a$ connected to the arm 59 and the shaft 52 respectively and arranged to advance either the spool 31 or 31$^a$ according to the direction of movement of the printing ribbon, pawls and ratchet wheels being provided substantially as shown.

After the printing impression has been effected I sever the printed ticket from the ticket strip by means of the traveling knife 62 and the stationary knife 62' (see Figure 1). The traveling knife 62 is carried at the upper extremity of the rod 63 mounted for vertical movement in brackets 64 in the casing 32, a spring 65 arranged between the lower bracket and the collar 66 on the rod serving to normally maintain the knife at its upper extremity. A bracket 67 is mounted on the arm 51 and is arranged with a ball-shaped head engaging the projecting arm 68 on the rod 63 to lower the rod whenever the arm 51 is depressed. This lowering movement compresses the spring 65 so that when the downward pressure is released the knife 62 is returned forcibly, severing the printed ticket against the stationary knife 63. To insure the full printing impression being effected prior to the severing of the printed strip I provide a catch 69 on the knife rod arranged to be engaged by the swinging pawl 70 when the ball-headed bracket 67 is depressed. Thus, as shown in Figure 1, an arm 71 of the pawl 70 is normally engaged by the head of the bracket 67, forcing the ratchet out of engagement with the catch 69. This arm 71 is so weighted, however, that when the ball bracket is moved downwardly the ratchet 70 swings inwardly and engages over the catch 69, holding the catch and the knife rod from upward movement until the ball bracket again contacts the arm 71 to swing the ratchet clear of the catch. This is effected, of course, upon the return of the hand lever 50 with its attached arm 51.

While it will be apparent that the illustrated embodiment herein illustrated is well calculated to adequately fulfill the objects primarily stated, it is to be understood that the invention is susceptible to variation, modification and change without departing from the spirit and scope of the invention as set forth in the subjoined claims.

Having described my invention, I claim:

1. A scale having a rotary indicating element resting on bearings in the framework of the scale, and electro-magnets energized by alternating current arranged to relieve the bearings of a portion of its weight, whereby the alternations of the current tend to vibrate the indicating element.

2. A scale having movable mechanism including a part resting upon bearings, magnetic means for supporting a portion of the weight of said part, and means actuated by movement of said movable mechanism from zero position to energize said magnetic means.

3. A scale having movable mechanism including a part resting upon bearings, electro-magnetic means for supporting a portion of the weight of said part, and a switch arranged to be closed by movement of said movable mechanism from zero position and in circuit with said electro-magnetic means.

4. A scale having movable mechanism including a part resting upon bearings, electro-magnetic means adapted to be activated by an alternating current for supporting a portion of the weight of said part, and a switch in circuit with said electro-magnetic means and a source of alternating current and arranged to be closed by movement of said movable mechanism from zero position.

ELMER C. POOL.